Oct. 30, 1928.
C. SCHRAYSSHUEN ET AL
1,689,367
CHAIN BAND
Filed June 7, 1927
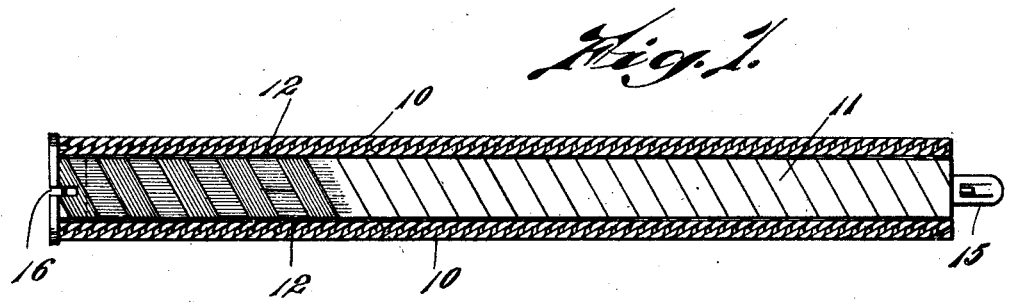
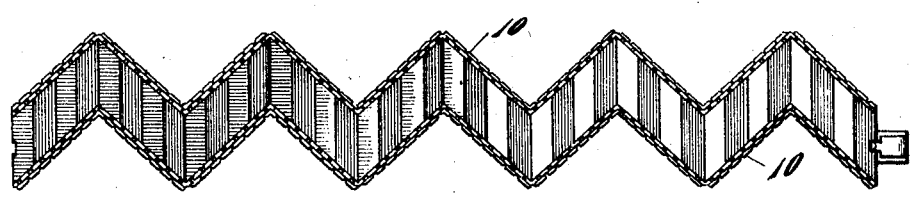
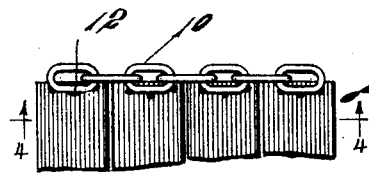 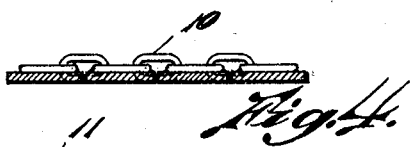
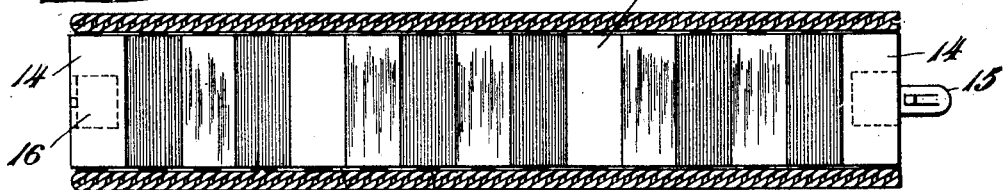
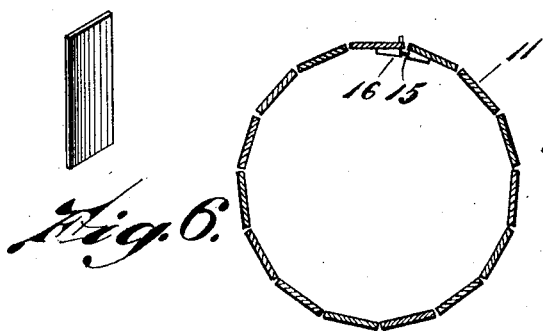
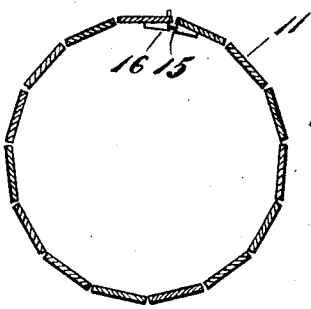
Inventors
Carl Schraysshuen
Friederich Renz
BY Barlow & Barlow
ATTORNEYS.

Patented Oct. 30, 1928.

1,689,367

UNITED STATES PATENT OFFICE.

CARL SCHRAYSSHUEN AND FRIEDRICH RENZ, OF PROVIDENCE, RHODE ISLAND, ASSIGNORS TO SPEIDEL CHAIN CO., OF PROVIDENCE, RHODE ISLAND, A FIRM COMPOSED OF FREDERIC SPEIDEL AND EUGEN SPEIDEL, BOTH OF PFORZHEIM, GERMANY.

CHAIN BAND.

Application filed June 7, 1927. Serial No. 197,161.

This invention relates to an improved construction of chain band; and has for its object to provide an ornamental band of this character constructed of a multiplicity of cross plates connected along their ends by ornamental marginal chain strands means being provided for attaching the end plates of the band, the band being adapted for use as a flexible bracelet, neck band, belt, girdle or for other similar purposes.

A further object of the invention is to attach a portion of the opposite ends of each plate to the links of the chain straps leaving a relatively wide unattached flexible portion of these chain strands to permit the maximum flexibility of the chain band.

With these and other objects in view, the invention consists of certain novel features of construction, as will be more fully described, and particularly pointed out in the appended claims.

In the accompanying drawings:

Figure 1 is a face view of one style of chain band in which the plates extend diagonally across between the marginal chain strands.

Figure 2 is a face view of another form of chain band in which the marginal edges take a zigzag line along its length these marginal chain strands being connected by cross plates.

Figure 3 is an enlarged view showing the different cross plates as soldered to the alternate chain links.

Figure 4 is the same as Figure 3 showing a sectional edge view of the cross plates as soldered to the alternate chain links.

Figure 5 is another arrangement of chain band in which the cross plates extend at right angles to the axis thru the band and their opposite ends are connected at intervals by solder to the opposite marginal chain strands.

Figure 6 is a perspective view of one of the cross plates.

Figure 7 is an end view of these cross plates in circular arrangement and showing a clasp for connecting the end plates together to form a band.

It is found in the construction of ornamental chain band of this character, of advantage to provide two strands of flexible ornamental chain arranged in spaced relation and connected by cross plates or members. These cross plates preferably having but a portion of their ends attached by solder or otherwise to the inner edges of the marginal strands leaving a space between the points of attachment whereby the chain strands are left free to flex and permit flexibility to the chain band. It is also found of advantage to provide attaching means on the end cross plates whereby the ends of this band may be attached either together or to some other object as to a watch or the like; and the following is a detailed description of the present embodiment of my invention and showing one means by which these advantageous results may be accomplished:—

With reference to the drawings, 10 designates two opposite chain strands which are arranged in spaced relation and extend along the length of the bracelet or band, the chain employed being preferably of the ornamental type to improve the appearance of the band.

Extending between these marginal chain strands is a multiplicity of cross plates 11 each of a greater width than the length of a chain link which form the body of the bracelet or band and we preferably attach a relatively small portion of each end of each plate by solder as at 12 to the links of the chain thereby providing a relatively wide space 13 between the points of attachment which gives to the band the maximum amount of flexibility and at the same time retains the plates in their desired positions. These plates may be of any desired length and carry any desired ornamentation on their faces or they may be of different colored material to render the bracelet or band handsome and attractive in appearance. The end plates 14 are preferably arranged one to carry a latch tongue 15 and the other a socket 16 to receive the latch tongue whereby these two opposite ends of the band may be releasably connected together. It is also found of advantage to attach the sides of the marginal chains at their extremities to the edge of the plates 14 so as to stiffen these chain strands on their ends and prevent them from displacement.

Our improved chain band is extremely simple and practical in construction and is effective in its operation and by its use we may provide a band of this character which is highly ornamental in appearance and which may be employed as a bracelet, neck band, belt or girdle or for any other purpose for which it is adapted.

The foregoing description is directed solely towards the construction illustrated, but we desire it to be understood that we reserve the privilege of resorting to all the mechanical changes to which the device is susceptible, the invention being defined and limited only by the terms of the appended claims.

We claim:

1. A chain band comprising a pair of spaced flexible link chains extending along opposite side edges of the band, and spacer bars of a width greater than the length of the links of the chains extending between the chains and with the edges of the bars closely adjacent, each bar being attached to said chains along a portion less than the width of the bar leaving an unattached flexible portion of chain between the points of attachment and between the edges of the bars.

2. A chain band comprising a pair of spaced flexible side chains each composed of a plurality of links and a plurality of spacer plates with their edges in close adjacency each of a width greater than the length of a link of said chains and extending between said chains, a portion of the opposite ends of each plate less than its width being attached to said chains leaving relatively wide unattached flexible portions of the chains between the adjacent edges of said plates.

3. A flexible band comprising a plurality of plates arranged parallel to each other with their edges in substantial contact, flexible chains extending along both ends of said plates, each chain composed of links of a length less than the width of said plates, each of said plates being attached at both of its ends to the links extending thereacross and leaving free links adjacent to those attached to permit of flexibility of the plates one relative to the other.

4. A chain band comprising a pair of spaced flexible link chains extending along opposite side edges of the band and spacer plates extending between the chains and with the edges of the plates closely adjacent, each plate being attached at its ends to said chains and leaving an unattached flexible portion of chain between the points of attachment and between the edges of the plates.

5. An ornamental chain embodying a multiplicity of juxtaposed thin substantially parallel-edged plates, and flexible articulated means fixedly attached to adjacent ends of said plates and in substantially the same plane therewith.

6. An ornamental chain for jeweler's use, embodying a series of thin plates having their edges which are transverse to the length of the chain adjacent to and free from each other, and flexible means attached to the ends of all of the plates between the edges thereof.

7. In an ornamental chain for jeweler's use a plurality of plates arranged in series with their adjacent edges disposed transversely of the length of the chain in juxtaposition to form a practically unbroken band, and flexible means disposed parallel with and in substantially the same plane as the plates and fixedly attached to the opposite ends thereof.

In testimony whereof we affix our signatures.

CARL SCHRAYSSHUEN.
FRIEDRICH RENZ.